(12) United States Patent
Iyengar et al.

(10) Patent No.: US 6,745,055 B1
(45) Date of Patent: Jun. 1, 2004

(54) DIGITAL CORDLESS TELEPHONE WITH SPEAKERPHONE IN A REMOTE HANDSET

(75) Inventors: Vasu Iyengar, Allentown, PA (US); James Charles Popa, Allentown, PA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/511,153

(22) Filed: Feb. 23, 2000

(51) Int. Cl.[7] .............................. H04B 1/38; H04B 1/00; H04B 7/00; H04M 1/38; H04Q 7/20
(52) U.S. Cl. ...................... 455/569.1; 455/462; 455/68; 455/465
(58) Field of Search ............................ 455/569.1, 462, 455/570, 527, 68, 465, 466, 561; 379/420.01, 420.02, 420.03

(56) References Cited

U.S. PATENT DOCUMENTS

| | | | |
|---|---|---|---|
| 4,378,603 A | * | 3/1983 | Eastmond ..................... 455/79 |
| 4,715,063 A | * | 12/1987 | Haddad et al. ......... 379/390.01 |
| 4,928,306 A | * | 5/1990 | Biswas et al. ......... 379/201.05 |
| 5,526,405 A | | 6/1996 | Toda |
| 5,572,575 A | * | 11/1996 | Yamamoto et al. ....... 455/412.1 |
| 5,757,792 A | | 5/1998 | Aoki |
| 5,832,390 A | * | 11/1998 | Irvin ...................... 455/569.2 |
| 5,867,574 A | | 2/1999 | Eryilmaz |
| 5,917,425 A | * | 6/1999 | Crimmins et al. ..... 340/825.49 |
| 5,926,766 A | | 7/1999 | Yamagata et al. |
| 5,930,719 A | | 7/1999 | Babitch et al. |
| 6,018,670 A | * | 1/2000 | Degenhardt .................. 455/561 |
| 6,377,679 B1 | * | 4/2002 | Hashimoto et al. .... 379/388.05 |
| 6,449,491 B1 | * | 9/2002 | Dailey ......................... 455/518 |
| 6,516,200 B1 | * | 2/2003 | Schmidt et al. ............. 455/518 |

FOREIGN PATENT DOCUMENTS

| | | |
|---|---|---|
| EP | 0 765 067 A2 | 3/1997 |
| EP | 0 784 395 A2 | 7/1997 |
| WO | WO 98/12893 | 3/1998 |

* cited by examiner

*Primary Examiner*—Lee Nguyen
*Assistant Examiner*—Raymond B. Persino
(74) *Attorney, Agent, or Firm*—William H. Bollman

(57) ABSTRACT

A digital cordless telephone combines speakerphone control information together with voice data information in each of a plurality of data packets transmitted between the remote handset and the base unit while the remote handset is operating in a speakerphone mode. To allow half-duplex speakerphone functionality in the digital remote handset, the speakerphone control information includes break-in information relating to a break in by the user of the remote handset into an ongoing conversation. To allow full-duplex, echo cancellation mode operation of the speakerphone functionality at the digital remote handset, the speakerphone control information includes coordinating information relating to an amount of echo cancellation performed by the base unit and by the remote handset. In the disclosed embodiment, the speakerphone control information further includes switching and signal level information.

27 Claims, 5 Drawing Sheets

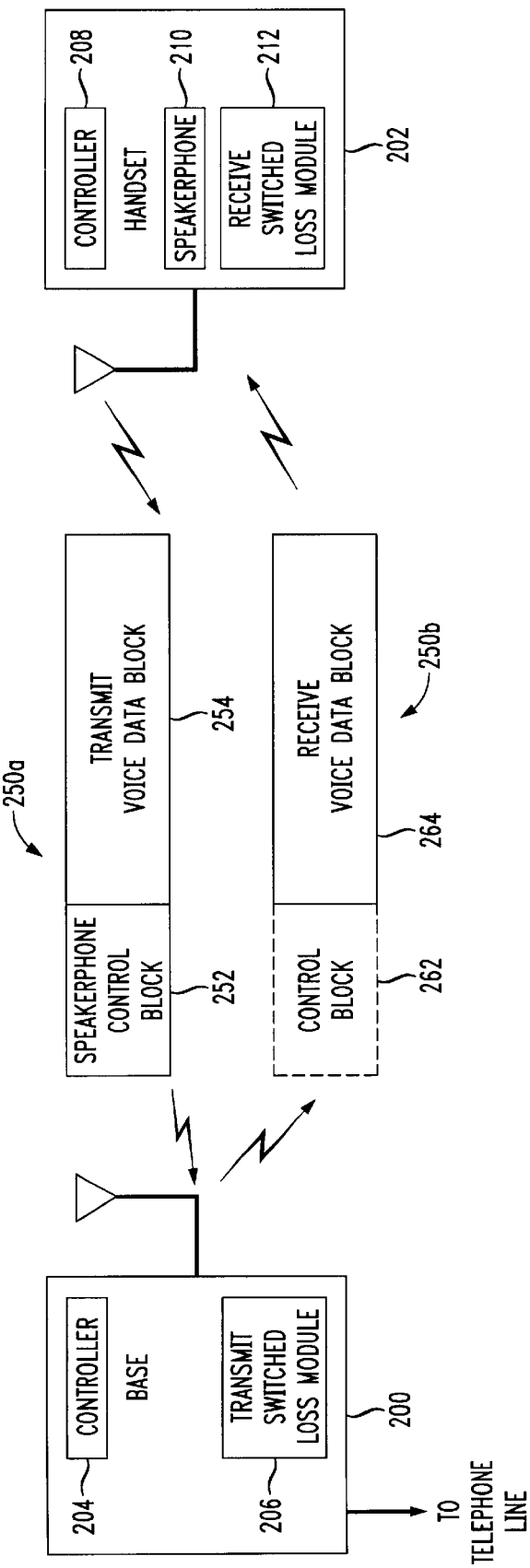
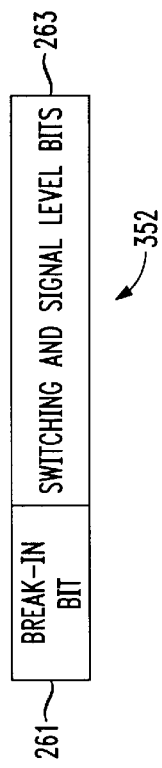
FIG. 1A(1)
HALF-DUPLEX MODE SOLUTION
FIG. 1A(2)

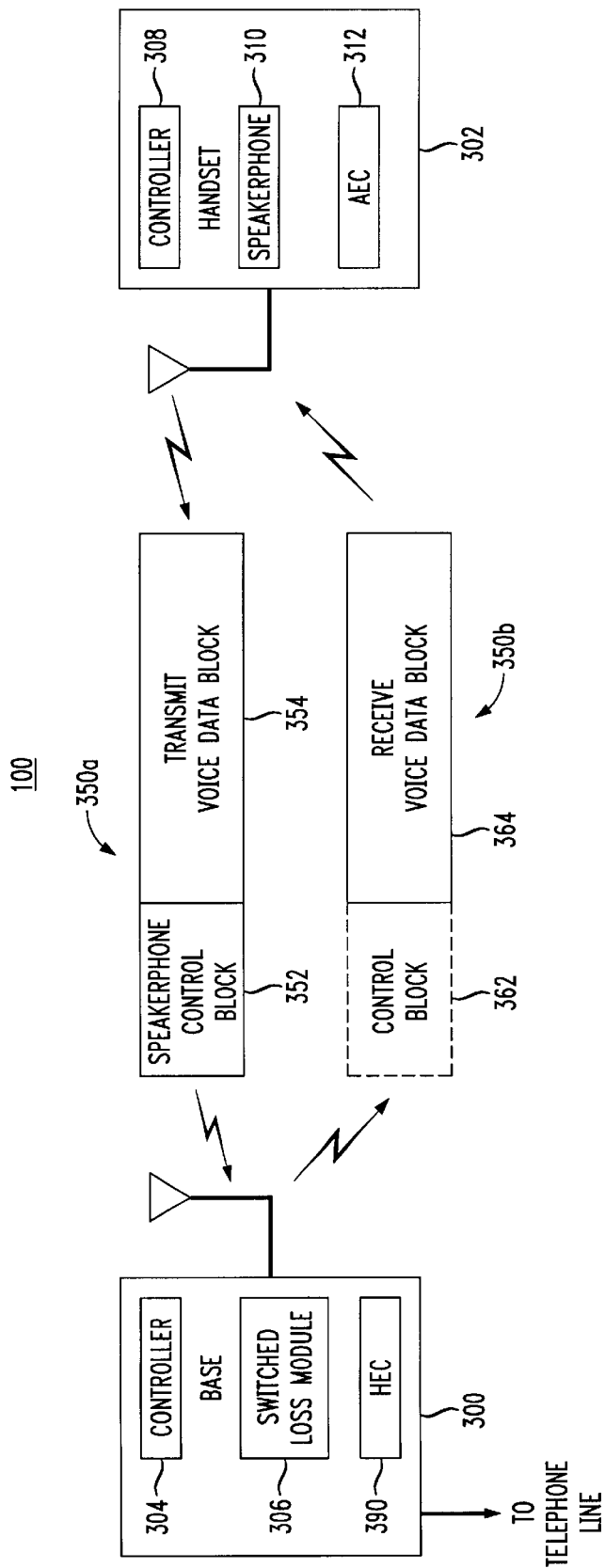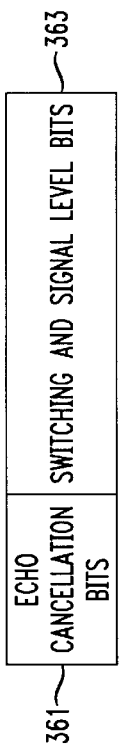

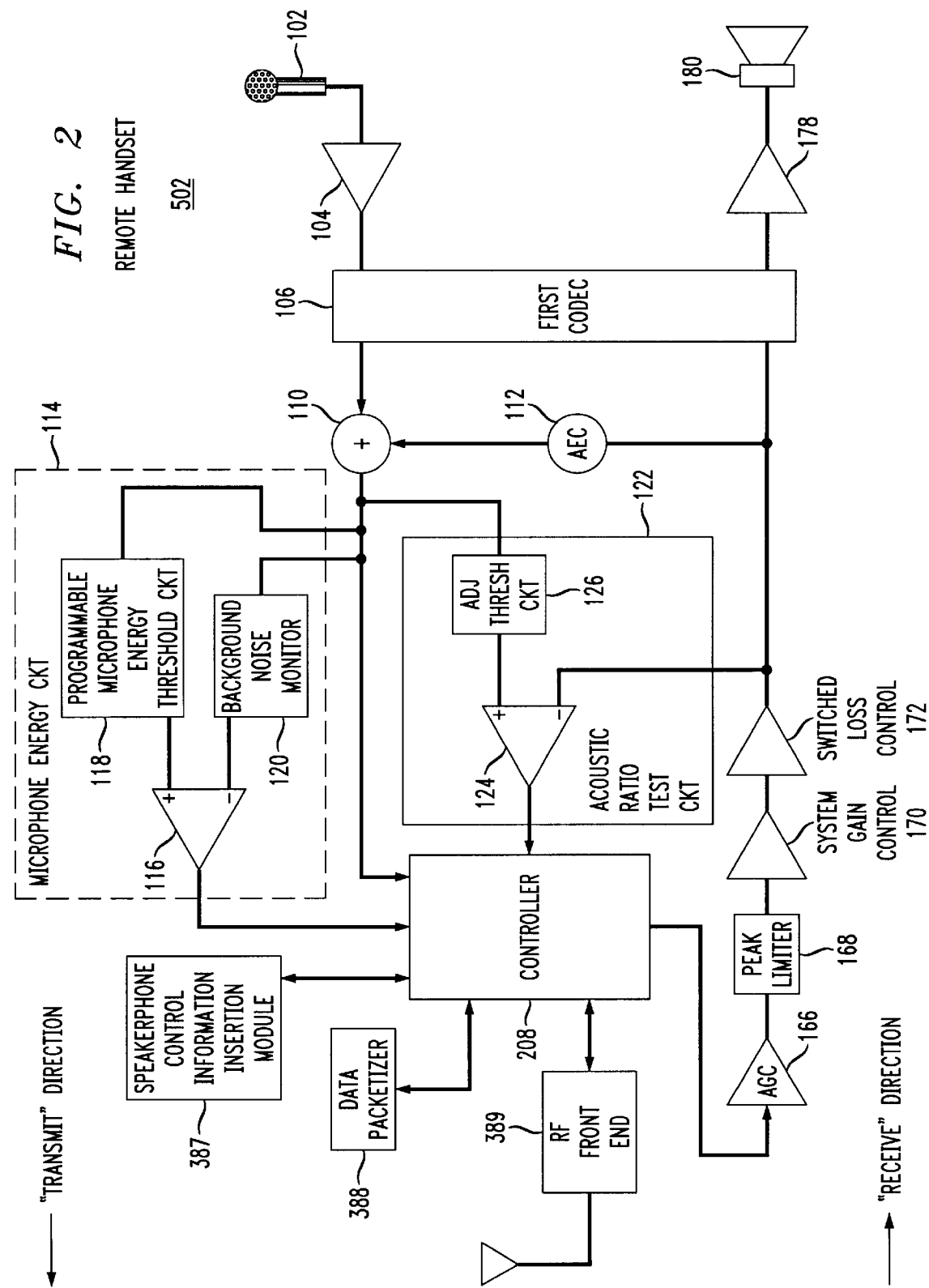

DIGITAL CORDLESS TELEPHONE WITH SPEAKERPHONE IN A REMOTE HANDSET

BACKGROUND OF THE INVENTION

1. Field of the Invention

The present invention relates generally to cordless telephones. More particularly, the present invention relates to the inclusion of speakerphone features in the remote handset of a digital cordless telephone.

2. Background of Related Art

Typical cordless telephones contain a base unit connected to a telephone line, and a portable unit or remote handset. The base unit and remote handset are coupled via a frequency modulated radio frequency (RF) link. The RF link either transmits the voice signals between the base unit and the remote handset using analog techniques (e.g., frequency modulation (FM), or using digital techniques (e.g., quadrature amplitude modulation (QAM) or frequency shift keying (FSK), etc.).

A speakerphone allows hands-free communication over a telephone line. A speakerphone typically includes a receiving element (e.g., a microphone) to detect voice and other sounds, and a transmitting element (e.g., a loudspeaker) to audibly broadcast sound signals.

As is well known, the placement of a microphone close to a speaker in a closed audio loop can cause annoying feedback, e.g., in the form of whining and wailing noises output from the speaker. To avoid feedback problems, speakerphones typically operate either in half-duplex mode, or in an echo-canceling mode.

In half-duplex mode, a conversation between two parties is carried in one direction at a time, essentially requiring the connected parties to take turns speaking. For example, when one party is transmitting, they cannot at the same time receive voice signals from the other party, and vice versa.

In echo canceling mode, a conversation is carried in both the transmitting and receiving directions simultaneously. Echo cancelers suppress portions of the voice signal that would normally cause feedback.

Speakerphones have been adequately implemented in the remote handset of analog cordless telephones. The short delay caused in the transmission of analog voice signals between the base unit and the corresponding remote handset prove negligible for use either in a half-duplex mode or in an echo canceling mode. In an analog implementation, the entire algorithm is implemented in the base unit, and the speaker and microphone in the remote unit are used to implement a speakerphone in the remote handset instead of the speaker and microphone in the base unit, passing the audio over the RF link, causing an insubstantial delay. However, an implementation of a speakerphone in the remote handset of a digital cordless telephone would face challenges not faced with analog telephone cordless telephones.

For instance, in a half-duplex mode digital speakerphone, the significant round trip delay in the digital communication link between the base unit and the remote handset would cause short bursts of what would appear to be echo at the receiving end due to packets already in the pipeline. A significant portion of these delays is typically caused by the time required to packetize and otherwise format the speech data, and/or by the delays inherent in a low bit rate encoding/decoding device (e.g., a code-excited linear predictive (CELP) device). The round-trip delays in a digital cordless telephone between the base unit and the remote handset are often in the range of 15 to 30 milliseconds or more.

For instance, suppose a speakerphone is implemented in the portable handset of a digital cordless telephone. In a receive mode, a receive signal is output through the speaker of the portable handset. If a transmit break-in occurs wherein the user of the portable handset is given use of the communication link to transmit to the base unit, the transmit and receive signals are mixed at the portable handset for a period of time based on the delay (e.g., 15–30 milliseconds) due to acoustic coupling at the portable handset. This signal mix is sent to the base unit where a switching decision is made. Until this switching decision is made, the received signal will be present at the portable handset. Because of the round trip delay, a few packets transmitted to the far end will contain the receive signal mixed in, which will be perceived at the far end as a short initial burst off echo.

Similarly, in echo canceling mode speakerphones the aforementioned delays must be addressed by the echo canceling algorithms used, also requiring significant memory and processing resources.

There is thus a need for a digital cordless telephone implementing a speakerphone in its portable handset which does not exhibit the disadvantages expected from the implementation of conventional speakerphone techniques in a digital cordless telephone.

SUMMARY OF THE INVENTION

In accordance with the principles of the present invention, a digital packet transmitted between a base unit and a remote handset of a digital cordless telephone comprises speakerphone control information adapted to allow speakerphone functionality in the remote handset, and voice data information relating to a telephonic conversation.

A digital cordless telephone in accordance with another aspect of the present invention comprises a base unit comprising a controller, an RF transmitter, and an RF receiver. A remote handset comprises a controller, a speakerphone including a microphone and a speaker, an RF transmitter, and an RF receiver. A digital communication link is coupled between the base unit and the remote handset. The digital communication link is adapted to digitally transmit information packets between the base unit and the remote handset in a half-duplex mode. The information packets comprise voice data and control information, the control information comprising break-in indicia indicating an occurrence of a break-in communication emanating from the microphone of the remote handset or a line-in signal from the base unit.

A digital cordless telephone in accordance with yet another aspect of the present invention comprises a base unit comprising a controller, an RF transmitter, and an RF receiver. A remote handset comprises a controller, a speakerphone including a microphone and a speaker, an RF transmitter, and an RF receiver. A digital communication link is coupled between the base unit and the remote handset. The digital communication link is adapted to digitally transmit information packets between the base unit and the remote handset in a full-duplex echo cancellation mode. The information packets comprise voice data and control information. The control information comprises echo cancellation information indicating an amount of echo cancellation performed by a transmitting one of the base unit and the remote handset.

A method of implementing a speakerphone function in a cordless telephone system in accordance with yet another aspect of the present invention comprises providing a base unit comprising a controller, an RF transmitter, and an RF receiver. A remote handset is provided comprising a controller, a speakerphone including a microphone and a speaker, an RF transmitter, and an RF receiver. A digital communication link is coupled between the base unit and the remote handset. The digital communication link is adapted to digitally transmit information packets between the base unit and the remote handset relating to a speakerphone functionality in the remote handset. Voice data and control information are inserted in the information packets. The control information comprises break-in indicia indicating an occurrence of a break-in communication emanating from the microphone of the remote handset.

A method of transmitting data packets between a base unit and a remote handset of a digital cordless telephone while the remote handset is in a speakerphone mode, in accordance with another aspect of the present invention comprises packetizing voice information relating to a conversation on the digital cordless telephone into a plurality of data packets, and inserting speakerphone control information into each of the plurality of data packets.

BRIEF DESCRIPTION OF THE DRAWINGS

Features and advantages of the present invention will become apparent to those skilled in the art from the following description with reference to the drawings, in which:

FIG. 1A(1) is a detailed schematic diagram of a digital cordless telephone including speakerphone control information together with transmitted voice data in information packets transmitted between a base unit and its associated remote handset to allow half-duplex speakerphone functionality in the remote handset, in accordance with the principles of the present invention.

FIG. 1A(2) shows exemplary information contained in the speakerphone control block shown in FIG. 1A(1) to allow half-duplex speakerphone functionality.

FIG. 1B(1) is a detailed schematic diagram of a digital cordless telephone including speakerphone control information together with transmitted voice data in information packets transmitted between a base unit and its associated remote handset to allow echo cancellation speakerphone functionality in the remote handset, in accordance with the principles of the present invention.

FIG. 1B(2) shows exemplary information contained in the speakerphone control block shown in FIG. 1B(1) to allow echo cancellation speakerphone functionality.

FIG. 2 is a more detailed block diagram of an exemplary embodiment of a remote handset of a digital cordless telephone including a speakerphone control information insertion module, in accordance with the principles of the present invention.

DETAILED DESCRIPTION OF ILLUSTRATIVE EMBODIMENTS

Figure 3:
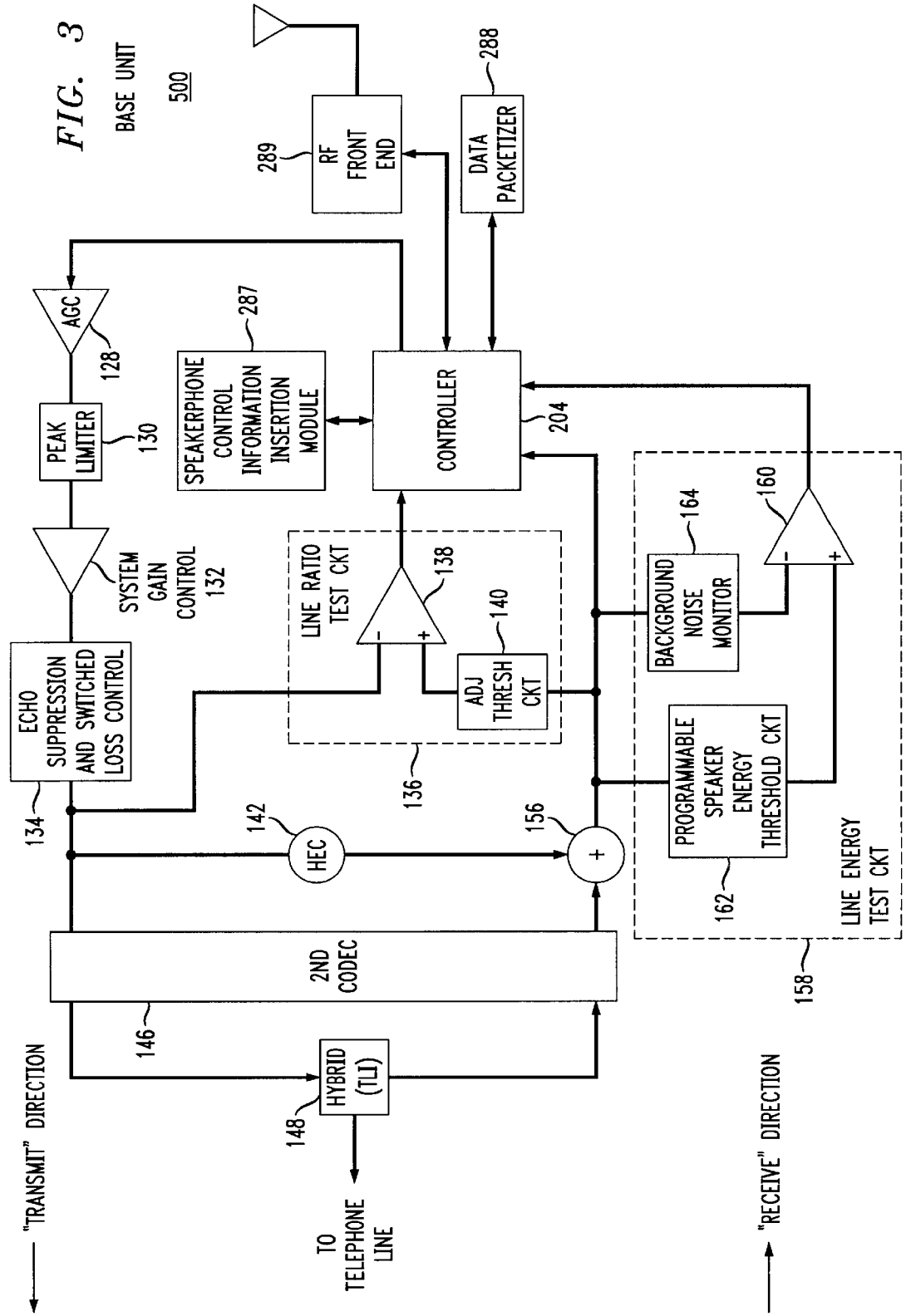
FIG. 3 is a more detailed block diagram of an exemplary embodiment of a base unit of a digital cordless telephone including a speakerphone control information insertion module, in accordance with the principles of the present invention.

The present invention provides a speakerphone in a remote handset of a digital cordless telephone without exhibiting disadvantages otherwise expected from an implementation of conventional speakerphone techniques in a digital cordless telephone.

FIGS. 1A(1) and 1A(2) depict a digital cordless telephone implementing a speakerphone in a remote handset utilizing half-duplex mode communications between a base unit 200 and a remote handset 202. In accordance with the principles of the present invention, digital information packets 250 transmitted between the base unit 200 and the remote handset 202 of a digital cordless telephone contain speakerphone control information in a speakerphone control block 252 in addition to voice data in a voice data block 254 to allow improved half-duplex operation.

Conventional digital cordless telephone systems typically transmit information packets containing only voice data. However, the present invention additionally includes control information in a speakerphone control block 252 portion of a transmitted information packet 250 together with the voice data block 254, allowing improved implementation of a speakerphone in a digital remote handset.

In addition to including the typical components known to those skilled in the art, the remote handset 202 of the digital cordless telephone 100 includes, a speakerphone 210, a receive switched loss module 212 for controlling the system switched loss during the transmit mode, and a controller 208 for generally controlling the operation of the remote handset 202. The controller 208 may be any suitable processor, e.g., a microprocessor, microcontroller, or digital signal processor (DSP) system.

In addition to otherwise conventional components, the base unit 200 includes a transmit switched loss module 206 for controlling the system switched loss during its receive mode, and a suitable controller 204 for generally controlling the operation of the base unit 200. The controller 204 may also be any suitable processor, e.g., a microprocessor, microcontroller, or digital signal processor (DSP) system.

When the digital cordless telephone 100 is in a receive mode, i.e., receiving a voice transmission from a party to whom the digital cordless telephone 100 is distantly connected through the public switched telephone network (PSTN), and when the user begins to speak, the remote handset 202 initiates a transmit break-in. At the onset of the transmit break-in, the transmit switched loss module 206 in the remote handset 202 switches the received signal OFF substantially immediately to prevent undesirable acoustic coupling at a microphone of the speakerphone 210. When a transmit break-in is received at the base unit 200, the switched loss control 134 is lifted to allow that packet to go through to the far end.

Preferably, each information packet 250 transmitted between the remote handset 202 and the base unit 200 contains both a voice data block 254 containing voice data and a speakerphone control block 252 containing control bits for proper speakerphone operation.

For instance, the disclosed speakerphone control block 252 contains a BREAK-IN flag (i.e., bit) 261 as shown in FIG. 1A(2) to indicate whether the associated voice data block 254 portion of the same information packet 250 is part of a break-in communication. In the disclosed example, a logic HIGH value of the BREAK-IN bit 261 might indicate that a break-in transmission is occurring, and a logic LOW value might indicate that the associated voice data block 254 of the same information packet 250 is not part of a break-in transmission.

When the first information packet 250 of the transmit break-in is received by the base unit 200, the BREAK-IN bit 261 causes the base unit 200 to stop substantially immediately transmission of the voice signal from the second party, and also lifts the switched loss control 134.

In the preferred embodiment, the speakerphone control block 252 also includes one or more switching and signal level flag bits 263 to indicate a signal level of the voice signal packetized in the voice data block 254, and to allow packet-to-packet control of additional switching decisions as necessary or desired.

A receive break-in is handled in a similar manner, except that control of a receive break-in resides in the base unit 200 in the disclosed embodiment. A receive break-in occurs when the digital cordless telephone 100 is in a transmit mode (i.e., transmitting voice signals to the second party), and the second party initiates a receive break-in by beginning to speak.

In this case, the base unit 200 would transmit an information packet 250 to the remote handset 202 with an activated or logic HIGH BREAK-IN bit 261 set in the speakerphone control block 252 of that information packet 250. Upon detection of the activated or logic HIGH BREAK-IN bit 261 by the remote handset 202, the remote handset 202 will cease transmission of that information packet 250, and instead go directly to preparing to receive the next information packet 250 from the base unit 200.

Thus, a digital cordless telephone 100 having a speakerphone in the handset 202 coordinates, at least while in a half-duplex speakerphone mode, break-ins between the base unit 200 and the remote handset 202 such that when either the base unit 200 or the remote handset 202 begins a break-in communication while in speakerphone mode, the other unit ceases transmission of its voice data. In addition, the appropriate switched loss is lifted to allow the output break-in packets to reach the intended party. Thus, the present invention reduces acoustic coupling between transmit and receive direction voice signals.

FIGS. 1B(1) and 1B(2) show another embodiment of the present invention wherein a digital cordless telephone implements a speakerphone in a remote handset 302 utilizing an echo canceling mode, in accordance with the principles of the present invention.

In FIG. 1B(1), a digital cordless telephone 100 includes a base unit 300 and a remote handset 302 including a speakerphone function 310. The base unit further includes a controller 304, a switched loss module 306, and a hybrid echo canceler 390. The remote handset 302 further includes a controller 308 and an acoustic echo canceler 312. The controllers 304, 308 may be any suitable processor, e.g., a microprocessor, a microcontroller, or a digital signal processor (DSP).

The hybrid echo canceler (HEC) 390 in the base unit 300 cancels echo signals experienced by a telephone line interface (TLI) or hybrid circuit used to couple the digital cordless telephone 100 to a telephone line. In the preferred embodiment, switched loss control via the switched loss module 306 resides in the base unit 300.

The acoustic echo canceler (AEC) 312 in the remote handset 302 is adapted to cancel echo signals experienced as a result of acoustic coupling of transmit and receive signals between a microphone and a speaker of the speakerphone 310 of the remote handset 302.

For communication to remain echo-free, it is necessary for the base unit 300 and the remote handset 302 to communicate with one another regarding the amount of echo cancellation applied to the voice data contained in respective voice data blocks. The controller continuously adjusts the switched loss and echo suppression depending upon how much echo cancellation is achieved in the system. The amount of switched loss to be used at any time is preferably communicated between the base unit and the remote handset. Conventional digital cordless telephones do not provide for such control information. However, the present invention solves this problem by including in each information packet 350 echo cancellation information, i.e., echo cancellation bits 361 (FIG. 1B(2)) representing an echo cancellation level achieved by the echo canceler 312 of the transmitting unit.

Thus, by including speakerphone control information together with voice data information in information packets transmitted between a remote handset and a base unit of a digital cordless telephone, half-duplex operation of a speakerphone function in the remote handset is made possible. Moreover, by including echo cancellation information together with voice data information in information packets, echo cancellation of a speakerphone function is alternatively or additionally made possible. This provides full-duplex speakerphone operation.

The schematic block diagram of FIGS. 2 and 3 shows an example of a digital cordless telephone 100 capable of operating a speakerphone function in a remote handset in either half-duplex mode or in echo canceling mode, in accordance with the principles of the present invention. The block diagram of FIG. 2 shows a remote handset 502 and the block diagram of FIG. 3 shows a base unit 500, each constructed in accordance with the principles of the present invention.

In particular, with reference to FIGS. 2 and 3, the digital cordless telephone system 100 includes both a base unit 500 and a remote handset 502.

The controllers 204, 208 of the base unit 500 and remote handset 502 are in communication with respective data packetizers 288, 388, speakerphone control information insertion modules 287, 387, and RF front ends 289. The data packetizers 288, 388 format the transmitted and received voice data transmitted between the base unit 500 and the remote handset 502, and the speakerphone control information insertion modules 287, 387 format the respective speakerphone control information as described herein and associate the same with the packets of voice data to be transmitted. The RF front ends 289, 389 provide a digital wireless communication link between the base unit 500 and the remote handset 502 for communication of the information packets 250*a*, 250*b* (or 350*a*, 350*b*) containing both voice data and speakerphone control information.

The transmit path of the system 100 additionally includes a microphone 102 (as part of the speakerphone 210) for converting sound into analog electrical signals, a microphone amplifier 104 for boosting the electrical signal level, a first codec (COder-DECoder) 106 for quantizing and encoding the analog signal as a digitized signal, and a background noise monitor 120. Further components in the transmit path of the system 100 include a transmit automatic gain control (AGC) 128, a peak limiter 130, a system gain control 132, and an echo suppression and switched loss control 134, followed by a second codec 146 to perform digital-to-analog conversion. The second codec 146 converts the digitized, processed signal back to an analog signal for transmission on the telephone line 150 through the telephone line interface (TLI) or hybrid 148.

The receive path of the system 100 includes the analog-to-digital direction of the second codec 146 for decoding and converting a received analog signal from the telephone line 150 into a digital signal for processing by the digital cordless telephone 100, and a background noise monitor 164. The receive path also includes a receive automatic gain control 166, a peak limiter 168, a system gain control 170, and a switched loss control 172, followed by the digital-to-analog direction of the first codec 106, a speaker amplifier 178, and finally a loudspeaker or speaker 180.

The TLI, hybrid circuit or hybrid 148 joins the transmit and receive paths. The hybrid 148 converts the tip and ring lines of a telephone line 150 into four lines, as is well known in the art.

An acoustic echo canceler (AEC) 112 and a hybrid echo canceler (HEC) 142 are coupled between the transmit and receive paths as shown in FIGS. 2 and 3. A summer 110 couples the AEC 112 to the output of the A/D direction of the first codec 106, and another summer 156 joins the HEC 142 to the output of the A/D direction of the second codec 146.

In addition to the above basic components, the digital cordless telephone system 100 contains a microphone energy circuit (or microphone energy detector) 114 for conducting microphone energy tests. An acoustic ratio test circuit 122 conducts acoustic ratio tests. A line energy test circuit (or line energy detector) 158 conducts line energy tests. A line ratio test circuit 136 conducts line ratio tests.

The microphone energy circuit 114 contains a comparator 116 for comparing the output of the background noise monitor 120 to a reference signal provided by a feedback loop and a programmable microphone energy threshold circuit 118. The output of the microphone energy circuit 114 is coupled to the handset controller (not shown).

The output of the acoustic ratio test circuit 122 is also coupled to the handset controller in the preferred embodiment. The acoustic ratio test circuit 122 includes a comparator 124 to compare the received line energy to a feedback signal 126a multiplied by an adjustable threshold from an adjustable threshold circuit 126.

In the preferred embodiment, the outputs of the line energy circuit 158 and the line ratio test 136 are coupled to the base unit controller (not shown). The line energy test circuit 158 contains a comparator 160 for comparing the output of the background noise monitor 164 to a reference signal provided by a feedback signal multiplied by a programmable speaker energy threshold circuit 162. The line ratio test circuit 136 contains a comparator 138 for comparing the transmit line energy to a feedback signal multiplied by an adjustable threshold from an adjustable threshold circuit 140.

Preferably, the digital cordless telephone system 100 having a speakerphone function in the remote handset 502 is a distributed control system. Those skilled in the art will appreciate that it may be possible and desirable to implement other components of the system 100 in the remote handset 202. However, power consumption demands upon the battery of the remote handset may make the inclusion of such additional components undesirable.

In operation, information packets containing speakerphone control information are transmitted approximately every 5 milliseconds (ms) in the disclosed embodiment. Of course, it will be understood by those skilled in the art that a faster or slower frequency is within the principles of the present invention, as is a larger or smaller period than that shown.

In half-duplex mode, a transmit break-in attempt occurs, for example, when the base unit 500 is transmitting information packets, and the user of the remote handset 502 user wishes to speak via a speakerphone function in the remote handset 502. The voice signal received by the microphone 102 and processed by the other components in the transmit path of the remote handset 502 is compared to a threshold level by the comparator 116 in the microphone energy circuit 114. If the controller of the remote handset 502 determines that a transmission from the remote handset 502 is to occur, the received signal (i.e., the voice data packets traveling opposite to the transmit direction) are substantially immediately switched OFF through the switched loss control 172. A BREAK-IN control bit is sent in the next information packet to the base unit 500 indicating that a break-in has occurred. In response, the base unit 500 stops transmitting information to the remote handset 502, to allow voice transmission from the remote handset 502 in the opposite direction through lifting of the switched loss 134.

A receive break-in is handled in a similar manner. That is, when a user is transmitting a voice signal via the remote handset speakerphone function and the party on the other end begins to send a voice signal, the base unit 500 determines that a break-in has occurred from the second party (non-handset user) and immediately stops the audible output of the received voice data information 264 from the remote handset 502 through the switched loss control 134. At the remote handset, the switched loss 172 is lifted to allow packets to go through to the speaker 180.

The base unit 500 break-in decision is preferably determined by a line energy test performed by the line energy test circuit 158. In the speakerphone control block (e.g., 262 as shown in FIG. 1A(1)) of the next base-to-handset packet 250b, a break-in bit is sent, causing the remote handset 502 to stop transmitting.

In the echo canceling mode of the digital cordless telephone system 100, without echo canceling, some of the signal output by the speaker 180 would likely be mixed with the transmit signal from the microphone 102 when the user of the remote handset 502 begins to speak. Without correction, this mixing of signals would be experienced by the second party as an echo. In the remote handset 502, the controller 208 measures the acoustic echo cancellation using techniques well known by those of ordinary skill in the art. This amount of acoustic echo cancellation is also indicated in the speakerphone control block of the information packets 350 to inform the base unit 500 of the current level of acoustic echo cancellation.

When the HEC 142 is activated in the base unit 500 to correct echoes introduced by the hybrid 148, the amount of hybrid echo cancellation is also included in the speakerphone control block 362 of information packets 350a transmitted to the handset.

The transmit AGC 128 amplifies weak microphone signals and alternatively attenuates strong signals, while the peak limiter 130 clips overshoots by the AGC 128, and the system gain 132 provides additional transmit path gain as needed.

In the disclosed embodiment, the AGC 128 and system gain 132 form a gain block capable of up to 24 decibels (dB) in the transmit path. Another gain block is formed with the AGC 166 and system gain control 170 in the receive path, providing a gain of up to 12 dB. Of course, any gain value may be possible in any particular application, all of which are within the principles of the present invention.

Figure 4:
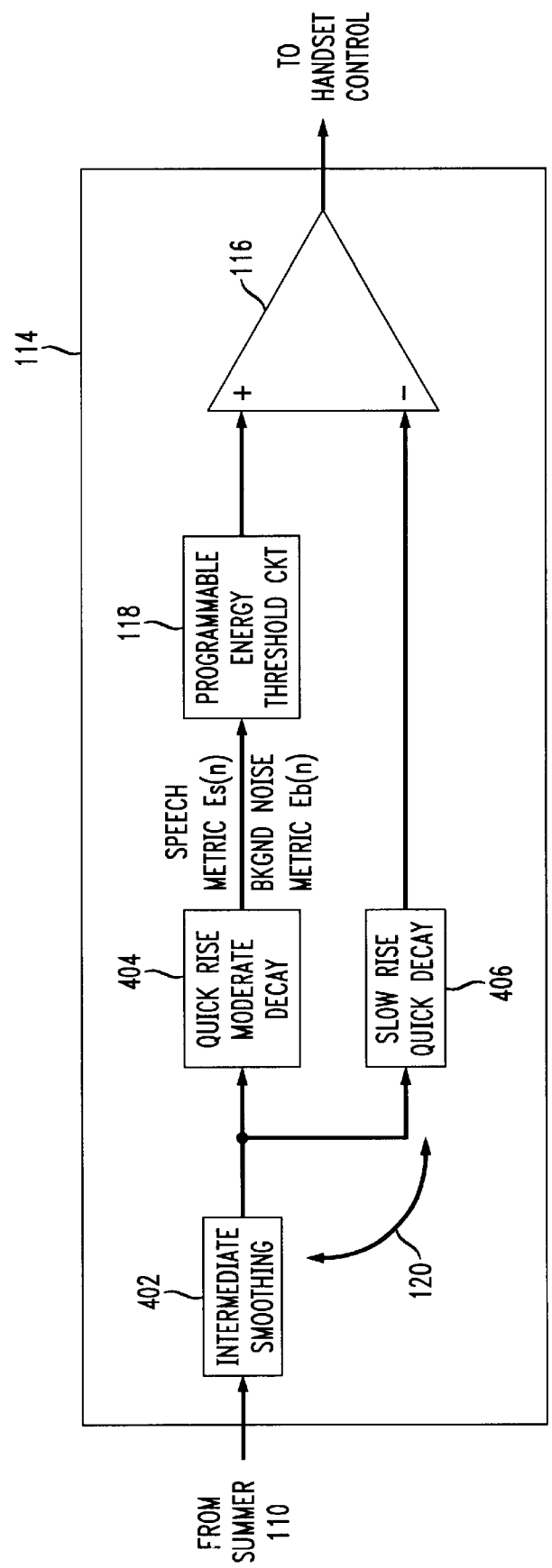
FIG. 4 shows the microphone energy circuit of FIG. 2 in more detail.

FIG. 4 shows the microphone energy circuitry 114 in more detail.

In particular, FIG. 4 shows that the input signal from the transmit path undergoes intermediate smoothing 402 and then a quick rise with moderate decay 404 before being multiplied by the programmable energy threshold circuit 118 to set an appropriate threshold for the positive input of the comparator 116. The background noise signal for the negative input of the comparator 116 is obtained by intermediate smoothing of the input signal 402 and then by undergoing a slow rise with quick decay 406.

The microphone energy test circuit 114 is incapable of distinguishing the voice input from the user of the remote handset 502 from the signal fed back by the microphone 102 from the speaker 180. The acoustic ratio test circuit 122 removes the effect of the fed back speaker signal on the energy from the microphone to prevent improper self-switching. The new microphone energy signal is multiplied by the adjustable threshold circuit 126 before being introduced to the positive input of the comparator 124.

The value of the digitized line energy of the receive path signal output from the switched loss control circuit 172 is passed to the negative input of the comparator 124. If the amplified microphone energy value is greater than the line energy value of the receive path, the remote handset 502 is presumed to be in the transmit mode. Conversely, if the amplified microphone energy value is less than the line energy value of the receive path, the remote handset 502 is presumed to be in the receive mode.

The line ratio test circuit 136 is used by the base unit 500 in a manner analogous to that of the acoustic ratio test circuit 122. The line energy detection circuit 158 is normally incapable of distinguishing between the line energy generated by the second party and the transmit energy generated from the microphone 102 of the remote handset 502. The line ratio test circuit 136 removes the effects of the receive path energy on the transmit path energy as seen by the base unit 500, to prevent improper self-switching.

In the line ratio test circuit 136, the receive path energy signal is multiplied by the threshold circuit 140 before being introduced to the positive input of the comparator 138. The digitized line energy value of the transmit path is passed to the negative input of the comparator 138. Thus, in operation, if the amplified line energy value from the receive path is greater than the line energy value from the transmit path, the base is presumed to be in the receive mode. Conversely, if the amplified line energy value from the receive path is less than the line energy value from the transmit path, the base unit 500 is presumed to be in the receive mode.

It will be clear to those of ordinary skill in the art that many of the functions shown schematically in FIGS. 2 and 3 may be implemented in software programmed into an appropriate processor, e.g., into the controller 204 of the base unit and/or into the controller 208 of the remote handset.

In accordance with the principles of the present invention, the state of the speakerphone function in a remote handset of a digital cordless telephone is indicated in a speakerphone control block associated with each (or many) of the voice data information packets transmitted and received between the base unit 500 and the remote handset 502 via a radio frequency (RF) digital communication link.

The switched loss is inversely proportional to the total echo cancellation, which is the sum of the HEC and AEC cancellation.

The current state of the speakerphone is decided by input from the line energy detector circuit 158 and the microphone energy detector circuit 114, as well as the results of the line ratio test circuit 136 and the acoustic ratio test circuit 122.

Thus, a novel cordless telephone/telephone system has been described combining the advantages of a digital communication link and a handset-implemented speakerphone.

While the invention has been described with reference to the exemplary embodiments thereof, those skilled in the art will be able to make various modifications to the described embodiments of the invention without departing from the true spirit and scope of the invention.

What is claimed is:

1. A digital packet transmitted between a base unit and a remote handset of a digital cordless telephone, comprising:

speakerphone control information adapted to allow speakerphone functionality in said remote handset; and voice data information relating to a telephonic conversation.

2. The digital packet transmitted between a base unit and a remote handset of a digital cordless telephone according to claim 1, wherein said speakerphone control information comprises:

switching and signal level information.

3. The digital packet transmitted between a base unit and a remote handset of a digital cordless telephone according to claim 1, wherein:

said digital packet allows a receiving device packet-to-packet control of respectively associated voice data information.

4. A digital packet transmitted between a base unit and a remote handset of a digital cordless telephone, comprising:

speakerphone control information adapted to allow speakerphone functionality in said remote handset, said speakerphone control information including break-in information; and voice data information relating to a telephonic conversation.

5. A digital packet transmitted between a base unit and a remote handset of a digital cordless telephone according to claim 4, wherein said speakerphone control information further comprises:

switching and signal level information.

6. A digital packet transmitted between a base unit and a remote handset of a digital cordless telephone, comprising:

speakerphone control information adapted to allow speakerphone functionally in said remote handset, said speakerphone control information including echo cancellation level information; and voice data information relating to a telephonic conversation.

7. The digital packet transmitted between a base unit and a remote handset of a digital cordless telephone according to claim 6, wherein said speakerphone control information further comprises:

switching and signal level information.

8. A The digital packet transmitted between a base unit and a remote handset of a digital cordless telephone, comprising:

speakerphone control information adapted to allow speakerphone functionality in said remote handset; and voice data information relating to a telephonic conversation;

wherein said speakerphone functionality is half-duplex.

9. A digital packet transmitted between a base unit and a remote handset of a digital cordless telephone, comprising:

speakerphone control information adapted to allow speakerphone functionality in said remote handset; and voice data information relating to a telephonic conversation;

wherein said speakerphone functionality is echo cancellation based.

10. A digital cordless telephone, comprising:
a base unit comprising a controller, an RF transmitter, and an RF receiver;
a remote handset comprising a controller, a speakerphone including a microphone and a speaker, an RF transmitter, and an RF receiver; and
a digital communication link coupled between said base unit and said remote handset, said digital communication link being adapted to digitally transmit information packets between said base unit and said remote handset;
wherein said information packets comprise voice data and control information, said control information comprising break-in indicia indicating an occurrence of a break-in communication emanating from one of said microphone of said remote handset and a line-in signal from said base unit.

11. A digital cordless telephone, comprising:
a base unit comprising a controller, an RF transmitter, and an RF receiver;
a remote handset comprising a controller, a speakerphone including a microphone and a speaker, an RF transmitter, and an RF receiver; and
a digital communication link coupled between said base unit and said remote handset, said digital communication link being adapted to digitally transmit information packets between said base unit and said remote handset in a full-duplex echo cancellation mode;
wherein said information packets comprise voice data and control information, said control information comprising echo cancellation information indicating an amount of echo cancellation performed by a transmitting one of said base unit and said remote handset.

12. The digital cordless telephone according to claim 11, further comprising:
an acoustic echo canceller in said remote handset; and
a hybrid echo canceller in said base unit.

13. A method of implementing a speakerphone function in a cordless telephone system comprising:
providing a base unit comprising a controller, an RF transmitter, and an RF receiver;
providing a remote handset comprising a controller, a speakerphone including a microphone and a speaker, an RF transmitter, and an RF receiver;
providing a digital communication link coupled between said base unit and said remote handset, said digital communication link being adapted to digitally transmit information packets between said base unit and said remote handset relating to a speakerphone functionality in said remote handset; and
inserting in said information packets, voice data and control information, said control information comprising break-in indicia indicating an occurrence of a break-in communication emanating from said microphone of said remote handset.

14. The method of implementing a speakerphone function in a cordless telephone system according to claim 13, wherein:
said speakerphone functionality is half-duplex.

15. The method of implementing a speakerphone function in a cordless telephone system according to claim 13, wherein:
said speakerphone functionality is full-duplex using an echo cancellation mode.

16. Apparatus for implementing a speakerphone function in a cordless telephone system comprising:
means for providing a base unit comprising a controller, an RF transmitter, and an RF receiver;
means for providing a remote handset comprising a controller, a speakerphone including a microphone and a speaker, an RF transmitter, and an RF receiver;
means for providing a digital communication link coupled between said base unit and said remote handset, said digital communication link being adapted to digitally transmit information packets between said base unit and said remote handset relating to a speakerphone functionality in said remote handset; and
means for inserting in said information packets, voice data and control information, said control information comprising break-in indicia indicating an occurrence of a break-in communication emanating from said microphone of said remote handset.

17. The apparatus for implementing a speakerphone function in a cordless telephone system according to claim 16, wherein:
said speakerphone functionality is half-duplex.

18. The apparatus for implementing a speakerphone function in a cordless telephone system according to claim 16, wherein:
said speakerphone functionality is full-duplex using an echo cancellation mode.

19. A method of transmitting data packets between a base unit and a remote handset of a digital cordless telephone while said remote handset is in a speakerphone mode, comprising:
packetizing voice information relating to a conversation on said digital cordless telephone into a plurality of data packets; and
inserting speakerphone control information into each of said plurality of data packets.

20. The method of transmitting data packets between a base unit and a remote handset of a digital cordless telephone while said remote handset is in a speakerphone mode according to claim 19, wherein:
said plurality of data packets are a contiguous stream of data packets.

21. The method of transmitting data packets between a base unit and a remote handset of a digital cordless telephone while said remote handset is in a speakerphone mode according to claim 19, wherein said speakerphone control information comprises:
switching and signal level information.

22. A method of transmitting data packets between a base unit and a remote handset of a digital cordless telephone while said remote handset is in a speakerphone mode, comprising
packetizing voice information relating to a conversation on said digital cordless telephone into a plurality of data packets; and
inserting speakerphone control information into each of said plurality of data packets, said speakerphone control information comprising break-in information.

23. The method of transmitting data packets between a base unit and a remote handset of a digital cordless telephone while said remote handset is in a speakerphone mode according to claim 22, wherein said speakerphone control information further comprises:
switching and signal level information.

24. A method of transmitting data packets between a base unit and a remote handset of a digital cordless telephone while said remote handset is in a speakerphone mode packetizing voice information relating to a conversation on said digital cordless telephone into a plurality of data packets; and inserting speakerphone control information into each of said plurality of data packets, said speakerphone control information comprising echo cancellation level information.

25. The method of transmitting data packets between a base unit and a remote handset of a digital cordless telephone while said remote handset is in a speakerphone mode according to claim 24, wherein said speakerphone control information further comprises:

switching and signal level information.

26. A method of transmitting data packets between a base unit and a remote handset of a digital cordless telephone while said remote handset is in a speakerphone mode, comprising:

packetizing voice information relating to a conversation on said digital cordless telephone into a plurality of data packets; and inserting speakerphone control information into each of said plurality of data packets;

wherein said speakerphone functionality is half-duplex.

27. A method of transmitting data packets between a base unit and a remote handset of a digital cordless telephone while said remote handset is in a speakerphone mode, comprising:

packetizing voice information relating to a conversation on said digital cordless telephone into a plurality of data packets; and inserting speakerphone control information into each of said plurality of data packets;

wherein said speakerphone functionality is echo cancellation based.

* * * * *